Sept. 30, 1969   A. BASHENOW ET AL   3,469,529
SEALING AND ALIGNING SYSTEM FOR A CENTRIFUGAL PUMP
Filed Aug. 14, 1967
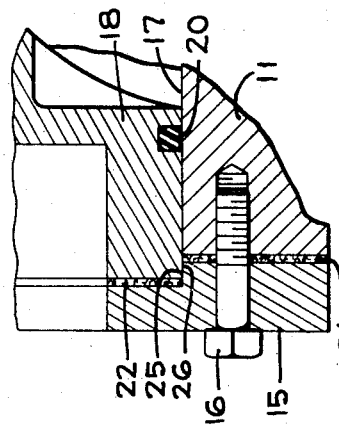
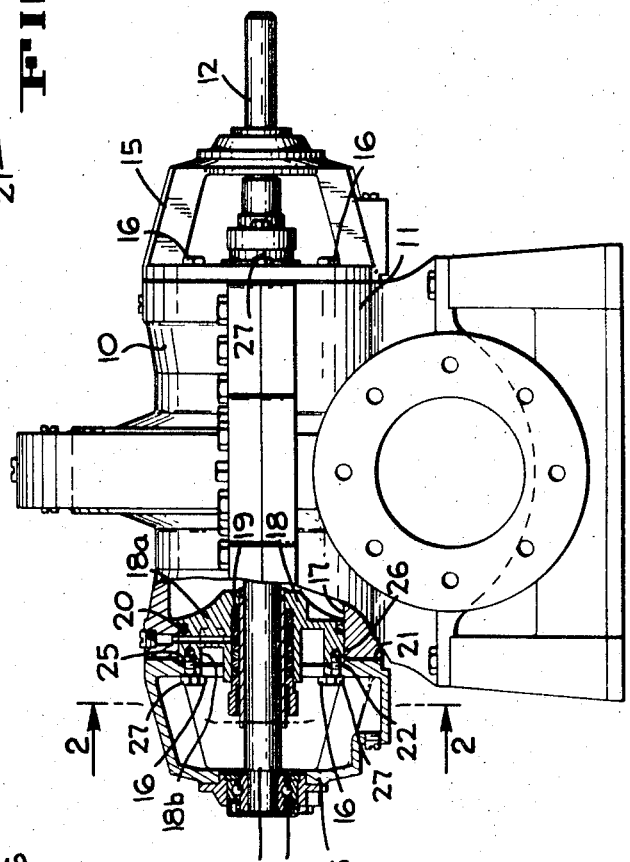
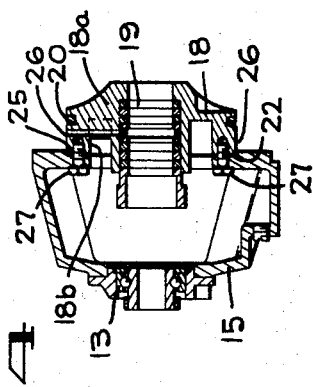
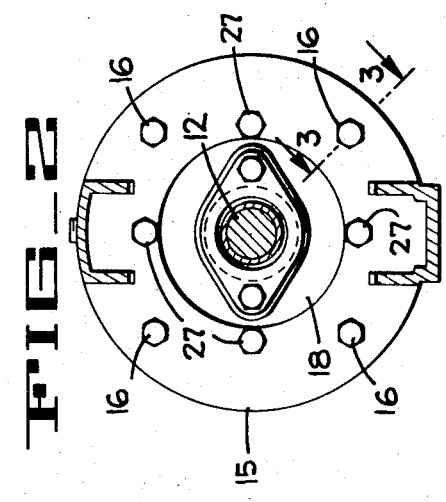
INVENTORS
ALEXANDER BASHENOW
RAMON VOLPATTI
BY
Francis W. Anderson
ATTORNEY United States Patent Office 3,469,529
Patented Sept. 30, 1969

3,469,529
SEALING AND ALIGNING SYSTEM FOR A
CENTRIFUGAL PUMP
Alexander Bashenow and Ramon Volpatti, Marion
County, Ind., assignors to FMC Corporation, San
Jose, Calif., a corporation of Delaware
Filed Aug. 14, 1967, Ser. No. 660,298
Int. Cl. F04d 29/08, 1/14
U.S. Cl. 103—111          1 Claim

ABSTRACT OF THE DISCLOSURE

A system for aligning and sealing a bearing bracket and a stuffing box of a split-casing centrifugal pump wherein the stuffing box has a body portion that accurately pilots in the casing bore and an annular extension that protrudes axially outward of said casing bore, a bearing bracket having a blind bore seated and aligned on the annular extension of the stuffing box, cap screws fastening the bearing bracket to the stuffing box such that it forms a sub-assembly that upon insertion in the casing bore is accurately aligned, and a second set of capscrews for fastening the sub-assembly to the casing halves.

BACKGROUND OF THE INVENTION

Field of the invention

The field of the invention is centrifugal pumps and more specifically sealing and aligning systems for split-casing centrifugal pumps.

Description of the prior art

In centrifugal pumps of the type having upper and lower halves joined along the longitudinal or shaft axis of the pump it is necessary to seal the aligned end bores of the pump around the shaft and also maintain the bearings for the shaft concentric with the casing bore. Several prior devices have attempted to satisfy these two requirements while maintaining ease of assembly and minimal expense.

One of the prior art devices is shown in the patent to Glazebrook 2,741,992. In this device the stuffing box is provided with an annular lip that extends between a blind bore in the bearing mount and the vertical end face of the pump casing. An annular gasket is then provided as a seal between the end faces of the bearing mount and the casing. This arrangement has not been satisfactory because two spaced radial surfaces of the stuffing box and bearing mount on the pump casing. The first radial surface is that which pilots in the casing bore whereas the second radial surface is that which is parallel to the first and engages the longitudinal surface of the blind bore of the bearing mount. Parallel machined surfaces such as these are expensive to produce accurately. In addition, the annular lip, if not accurately machined, will prevent adequate tightening of the bolts between the bearing mount and the casing and thus may prevent proper compression of the sealing gasket therebetween.

Another unsatisfactory device is shown in the patent to Kilbane et al. 3,282,221. In this device one of three modes of aligning can be accomplished: one, the stuffing box radial outer surface is machined to pilot in the bore and the inner and central annular shoulder is machined to pilot into the central bore of the bearing housing. Two, the radial surface of the annular shoulder of the bearing housing is machined to pilot into the casing bore and the annular shoulder of the stuffing box is machined to pilot into the central bore of the bearing housing. Three, the radial outer surface of the stuffing box and the outer surface of the annular shoulder of the bearing housing are machined to pilot into the casing bore. The disadvantage of the first two alternatives is that in each a set of parallel surfaces, e.g., the stuffing box outer radial surface and the central annular shoulder, must be machined. In the last alternative only the surfaces abutting the casing bore need be machined; however, with this arrangement the stuffing box and bearing housing cannot be securely joined as a unit remote from the pump casing and then inserted as a sub-assembly.

SUMMARY OF THE INVENTION

Applicants' system overcomes the disadvantages of the prior art as exemplified by the above mentioned patents. The alignment of the stuffing box is accomplished by accurately machining its radial outer surface. This same surface is used to align the bearing bracket. Thus, the bearing bracket can be aligned and securely fastened to the stuffing box at a location remote from the pump casing and as a sub-assembly can later be piloted into the casing bore. Also, since the alignment is done on a single surface the machining is inexpensive and accurate. Still further, the casing bore can be inexpensively and effectively sealed from the exterior of the pump casing by two gaskets. The first gasket can be inserted when the sub-assembly of the bearing bracket and stuffing box is being assembled and the remaining gasket can be inserted between the vertical end faces of the pump casing and the bearing bracket prior to piloting the sub-assembly into the casing bore.

BRIEF DESCRIPTION OF THE DRAWINGS

FIGURE 1 is a side elevation partly in section of a split-casing pump embodying the invention.

FIGURE 2 is an enlarged vertical section taken along the line 2—2 of FIGURE 1.

FIGURE 3 is a fragmentary, enlarged section taken generally along the line 3—3 of FIGURE 2.

FIGURE 4 is a section of a sub-assembly of the stuffing box and bearing bracket removed from the pump shown in FIGURE 1.

DESCRIPTION OF THE PREFERRED EMBODIMENT

In general, the split-casing pump shown in FIGURE 1 includes an upper casing half 10 and a lower casing half 11 joined along the center line of a shaft 12. The shaft is journaled in bearings 13, only one being shown, and supports a conventional double suction type impeller also not shown. The bearings are accurately positioned in bearing brackets 15 that are fastened to the end faces of the casing halves by cap screws 16 (FIG. 2). For the purpose of this description the bearing brackets and the structure hereinafter to be described may be considered identical for each end of the pump. The casing halves form a casing bore 17 each end of which is closed by a stuffing box 18. The stuffing box includes a body portion 18a and an annular extension 18b protruding axially outward of the casing halves. A conventional packing 19 is mounted in the body portion and seals the area immediately around the shaft. The stuffing box is also provided with an O-ring seal 20 as well as an outer annular gasket 21 and an inner annular gasket 22. These latter seal and gaskets prevent leakage into or out of the casing bore from around the stuffing box.

It is necessary, of course, that the casing not only be sealed against leakage, as above, but also that the bearings 13 and shaft 12 be concentrically aligned in the casing bore 17. This requires exact positioning of the bearing bracket 15 concentrically with the bore. As best shown in FIGURE 3 the bearing bracket is provided with a central blind bore 25 that is machined to close tolerances to seat snugly about a machined radial outer surface 26 of the annular extension 18b. In this manner the bearing bracket is accurately aligned on the stuffing box and is held in place by a plurality of cap screws 27. The radial outer surface of the body portion is machined to close tolerances to fit as well into the casing bore 17. In effect, the radial outer surfaces of the body portion and annular extension form a common cylindrical surface.

As can be readily seen the alignment of the bearing bracket 15, and thus the bearing 13, is extremely accurate since it is aligned on the same surface that is piloted into the casing bore, that is, the above common cylindrical surface of the stuffing box. This arrangement also provides for joining the stuffing box and the bearing bracket at a loctaion removed from the pump as a separate sub-assembly. Later the sub-assembly may be piloted into the casing bore. When finally piloted into the casing bore the accurate alignment of the bracket on the stuffing box assures perfect alignment of the sub-assembly. These and other advantages should be apparent from the foregoing description.

While a preferred embodiment of the invention has been shown and described it is understood that it is capable of variation without departing from the principles of the invention. Accordingly, the invention should be limited only by the scope and proper interpretation of the accompanying claim.

Having completed a detailed description of the invention so that those skilled in the art could practice the same, we claim:

1. An aligning and sealing apparatus for a pump comprising
   a pump housing defining an elongate internal cylindrical pilot bore surface extending inwardly from the outer end face of said housing,
   a stuffing box having a body portion provided with an elongate external cylindrical pilot surface interengaged with said pilot bore surface,
   a portion of said external pilot surface extending axially outwardly from said housing outer end face,
   a bearing bracket having a blind bore defining a second elongate internal cylindrical pilot bore surface, said second bore surface being seated and aligned on said outwardly extending external pilot surface portion,
   means releasably securing said bearing bracket and said stuffing box together as a unit,
   and means releasably securing said bearing bracket-stuffing box unit to said pump housing,
   said elongate external cylindrical pilot surface being the sole aligning surface of the stuffing box that contacts both the bearing bracket and the housing, whereby said bearing bracket may be secured to said stuffing box to form a unit-handled assembly for subsequent alignment with and assembly to said pump housing by piloting said stuffing box body portion external surface into said pump housing internal pilot bore, and securing the same therein.

References Cited
UNITED STATES PATENTS

| 3,160,107 | 12/1964 | Ross. | |
| 3,167,021 | 1/1965 | Sence. | |
| 3,249,057 | 5/1966 | Callahan. | |
| 3,282,221 | 11/1966 | Kilbaine et al. | 103—104 |

HENRY F. RADUAZO, Primary Examiner

U.S. Cl. X.R.

103—104

PO-1050
(5/69)

UNITED STATES PATENT OFFICE
CERTIFICATE OF CORRECTION

Patent No. 3,469,529                           Dated September 30, 1969

Inventor(s) A. Bashenow

It is certified that error appears in the above-identified patent and that said Letters Patent are hereby corrected as shown below:

Column 1, line 50,    insert after "box" --must be machined to align the stuffing box--.
Column 1, line 68,    insert after "the" --central--.

SIGNED AND
SEALED
Feb 9, 1971

(SEAL)
Attest:

Edward M. Fletcher, Jr.
Attesting Officer

WILLIAM E. SCHUYLER, JR.
Commissioner of Patents